(12) United States Patent
Wu et al.

(10) Patent No.: US 7,490,848 B2
(45) Date of Patent: Feb. 17, 2009

(54) FIXED-DIRECTION WHEEL CONTROL MECHANISM FOR BABY STROLLER

(75) Inventors: Tse-Chien Wu, Kaohsiung (TW); Sen-Yung Jiang, Yunlin County (TW)

(73) Assignee: Link Treasure Limited, Tortola (VG)

( * ) Notice: Subject to any disclaimer, the term of this patent is extended or adjusted under 35 U.S.C. 154(b) by 176 days.

(21) Appl. No.: 11/482,786

(22) Filed: Jul. 10, 2006

(65) Prior Publication Data

US 2007/0013156 A1 Jan. 18, 2007

(30) Foreign Application Priority Data

Jul. 12, 2005 (TW) .............................. 94211846 U

(51) Int. Cl.
*B62B 5/04* (2006.01)
(52) U.S. Cl. .................... 280/657; 280/647; 280/47.38; 16/18 R; 188/24.18
(58) Field of Classification Search ............. 280/47.34, 280/47.38, 47.25, 43, 647, 648, 649, 650, 280/657, 658; 16/18 R, 35 R; 188/24.15, 188/24.18, 24.21
See application file for complete search history.

(56) References Cited

U.S. PATENT DOCUMENTS

| | | | | | |
|---|---|---|---|---|---|
| 4,028,773 | A | * | 6/1977 | Morgan | 16/35 R |
| 4,349,938 | A | * | 9/1982 | Fontana | 16/35 R |
| 5,062,179 | A | * | 11/1991 | Huang | 16/436 |
| 5,184,835 | A | * | 2/1993 | Huang | 280/47.371 |
| 6,086,284 | A | * | 7/2000 | Callahan | 403/93 |
| 6,550,801 | B1 | * | 4/2003 | Newhard | 280/642 |
| 6,584,641 | B1 | * | 7/2003 | Milbredt | 16/35 R |
| 7,065,827 | B2 | * | 6/2006 | Hsiao | 16/44 |
| 7,213,818 | B2 | * | 5/2007 | Chang | 280/47.38 |

* cited by examiner

*Primary Examiner*—Christopher P Ellis
*Assistant Examiner*—John D Walters
(74) *Attorney, Agent, or Firm*—Muncy, Geissler, Olds & Lowe, PLLC

(57) ABSTRACT

A mechanism for switching the wheels of baby stroller between a fixed-direction mode and a free steering mode by a far-end controller drives a positioning member through a connecting member. The positioning member is used to catch and fix the wheel seat of the stroller into the fixed-direction mode, and is also capable of releasing the wheel seat back into the freeing steering mode. The far-end controller enables a user to shift the mode of steering without bending down, and eliminates the need to suspend the front wheel while steering the baby stroller, in order to change direction.

20 Claims, 6 Drawing Sheets

_US 7,490,848 B2_

FIXED-DIRECTION WHEEL CONTROL MECHANISM FOR BABY STROLLER

This application claims priority of Application No. 094211846 filed in Taiwan, R.O.C. on Jul. 12, 2005 under 35 U.S.C. § 119, the entire contents of which are hereby incorporated by reference.

BACKGROUND OF THE INVENTION

1. Field of the Invention

The invention relates to a wheel control mechanism for a baby stroller and, in particular, to a remote control mechanism for switching the wheel seat between a fixed-direction mode and a free steering mode.

2. Description of the Prior Art

If a user is pushing a baby stroller and the front wheel is then set into a fixed-direction mode, the user must press the handle bar of the baby stroller downward in order to tilt the front wheel upwards, in order to change the direction of the baby stroller. This is both laborious to the user and dangerous to the baby sitting in the baby stroller. To reduce labor involved in directional changes and more smoothly push the baby stroller, some strollers have a front wheels with both a fixed-direction mode and free steering mode. When the front wheels are switched into the fixed-direction mode, the stroller will move in a straight direction, and when the front wheels are switched into the free steering mode, the direction of the stroller can be more easily changed. An example of this type of front wheel can be seen, for example, in U.S. Pat. No. 6,671,926. However, the operation of a stroller with this type of front wheel is inconvenient, as the user must bend their body down to reach the wheels, in order to switch the wheels into another mode.

SUMMARY OF THE INVENTION

In order to avoid the problems found in the prior art, the present invention provides a remote control mechanism for switching the modes of the stroller wheels. This allows a user to have a far-end controller, to switch the wheels between a fixed-direction mode and a free steering mode. The mechanism includes a far-end controller, a connecting member, and a positioning member. The far-end controller drives the positioning member through the connecting member. The positioning member is used to catch the wheel of stroller and fix it into a fixed-direction mode, and is capable of releasing the wheel back into a free steering mode. The far-end controller of the present invention can be installed on any portion of the frame of a stroller, to enable a user to shift the steering mode without bending down. The far-end controller of the present invention also removes the need to suspend the front wheel in order to change the steering direction of the baby stroller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
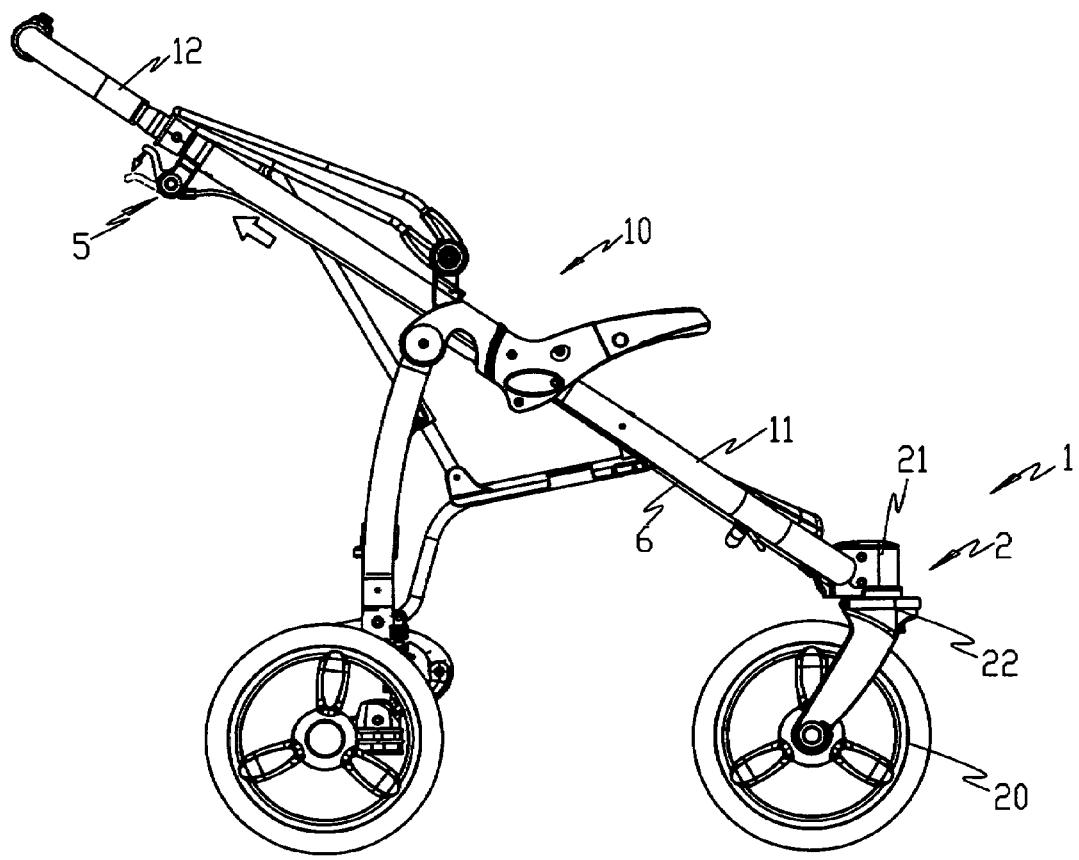
FIG. 1 is a schematic side view of a fixed-direction wheel control mechanism for a baby stroller, installed in the frame of the baby stroller.

FIG. 1 is an embodiment of the fixed-direction wheel control mechanism (1) equipped on the frame of a stroller to facilitate switching wheels between a fixed-direction mode and a free steering mode. In this embodiment, the fixed-direction wheel control mechanism (1) is installed between the handle tube (12) of a baby stroller (10) and a wheel assembly (2), and includes a far-end controller (5), a connecting member (6), and a positioning member (3).

In this embodiment, the frame of the baby stroller (10) includes a front foot tube (11) having an end extended towards the center section thereof, and a handle tube (12) for a user to hold in order to push the baby stroller around.

Figure 2:
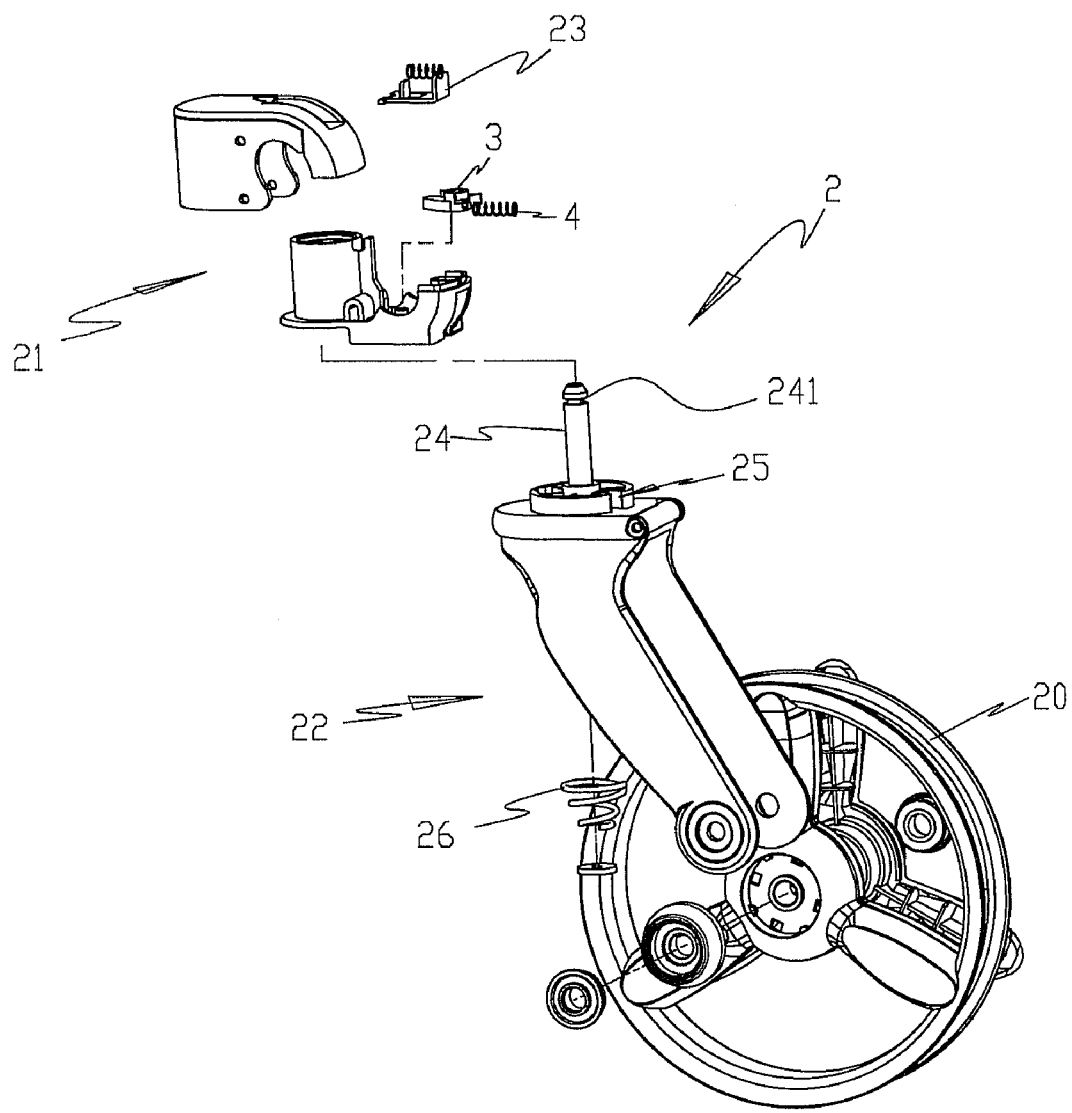
FIG. 2 is a schematic, exploded view of the members of the fixed-direction wheel control mechanism for a baby stroller of the present invention.
Figure 3:
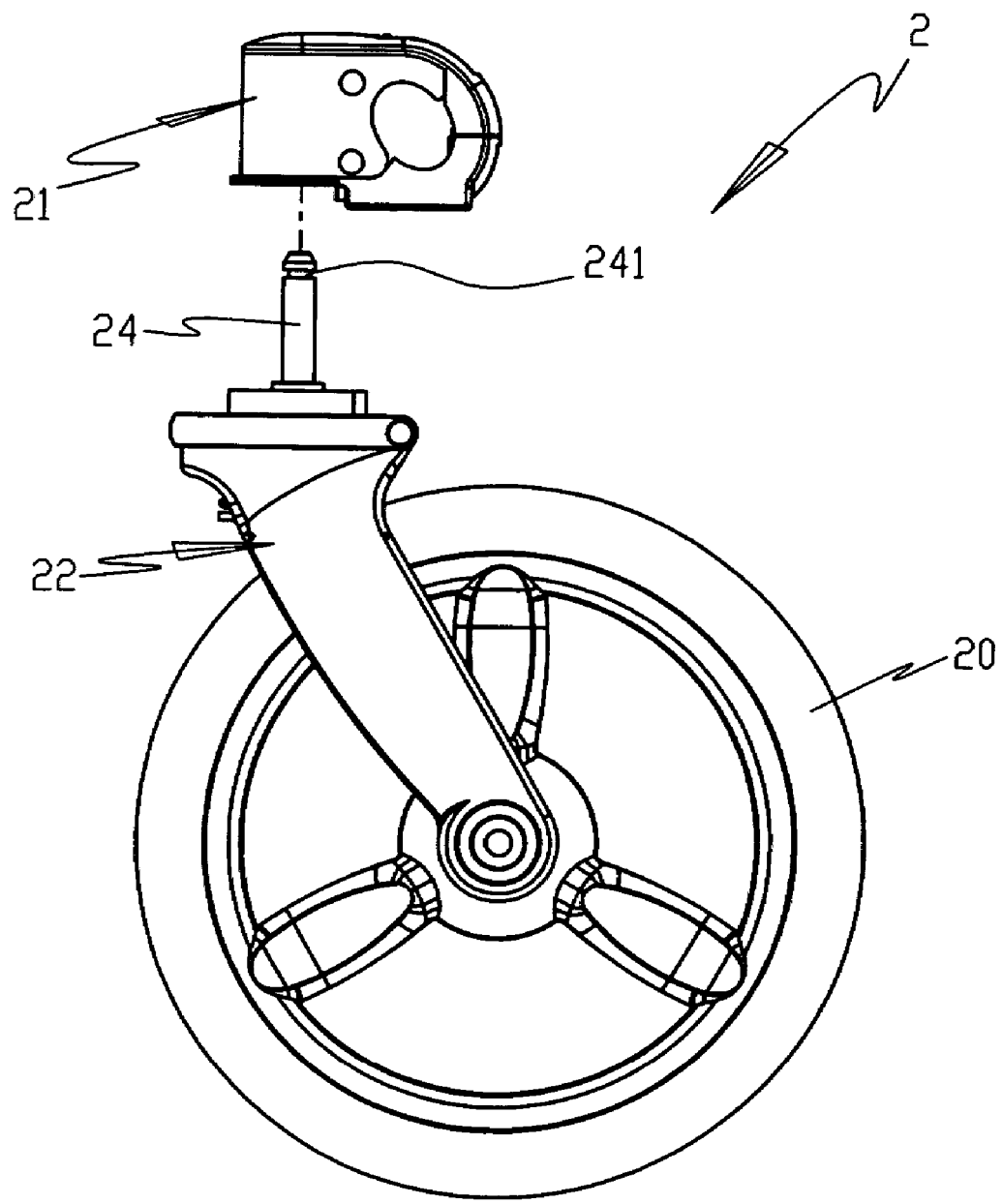
FIG. 3 is a schematic, exploded view of the wheel assembly of the present invention.

As shown in FIGS. 2 and 3, the wheel assembly (2) is equipped at the lower end of the front foot tube (11) and includes a base seat (21) and a wheel seat (22). The base seat (21) is connected to the lower end of the front foot tube (11) and includes a fastener (23) to keep the base seat (21) connected with the wheel seat (22).

The wheel seat (22) for a carrying wheel (20) has a pivot shaft (24) extending upwardly from the top portion thereof, for pivotally connecting the wheel seat (22) with the base seat (21). A limiting ring (241) is provided at the distal end of the pivot shaft (24). The wheel seat (22) is capable of rotating freely with the pivot shaft (24), and is detachable from the base seat (21) before the fastener (23) is secured into the limiting ring (241). To catch the wheel seat (22) and fix the wheel seat (22) to prevent it from freely rotating, the top of the wheel seat (22) is provided with a recess to form a positioning portion (25). Preferably, a spring (26) can be provided at the wheel seat (22) to absorb any shocks from a bumpy road, to provide a smoother ride for the baby sitting on the stroller.

Figure 4:
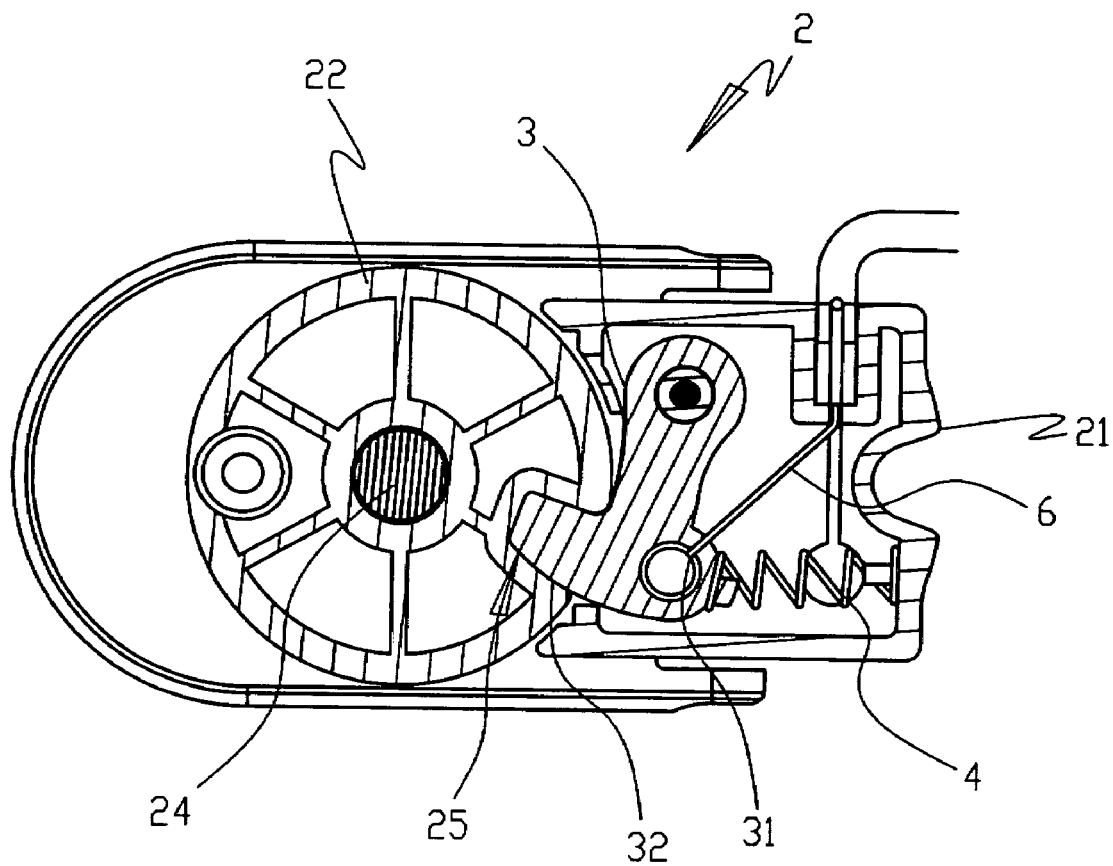
FIG. 4 is a schematic, cross-sectional view showing the positioning member moved into the positioning portion of the wheel seat of the present invention.

As shown in FIGS. 2 and 4, a positioning member (3) pivotally connected to the base seat (21) includes a connecting end (31) and a salient block (32). The salient block (32) is installed between the base seat (21) and the positioning member (3). In this embodiment, the salient block (32) can be a compression spring for biasing the positioning member (3) to move into the positioning portion (25), in order to catch and fix the wheel seat (22). In this way, the baby stroller is kept in a fixed-direction mode.

Figure 5:
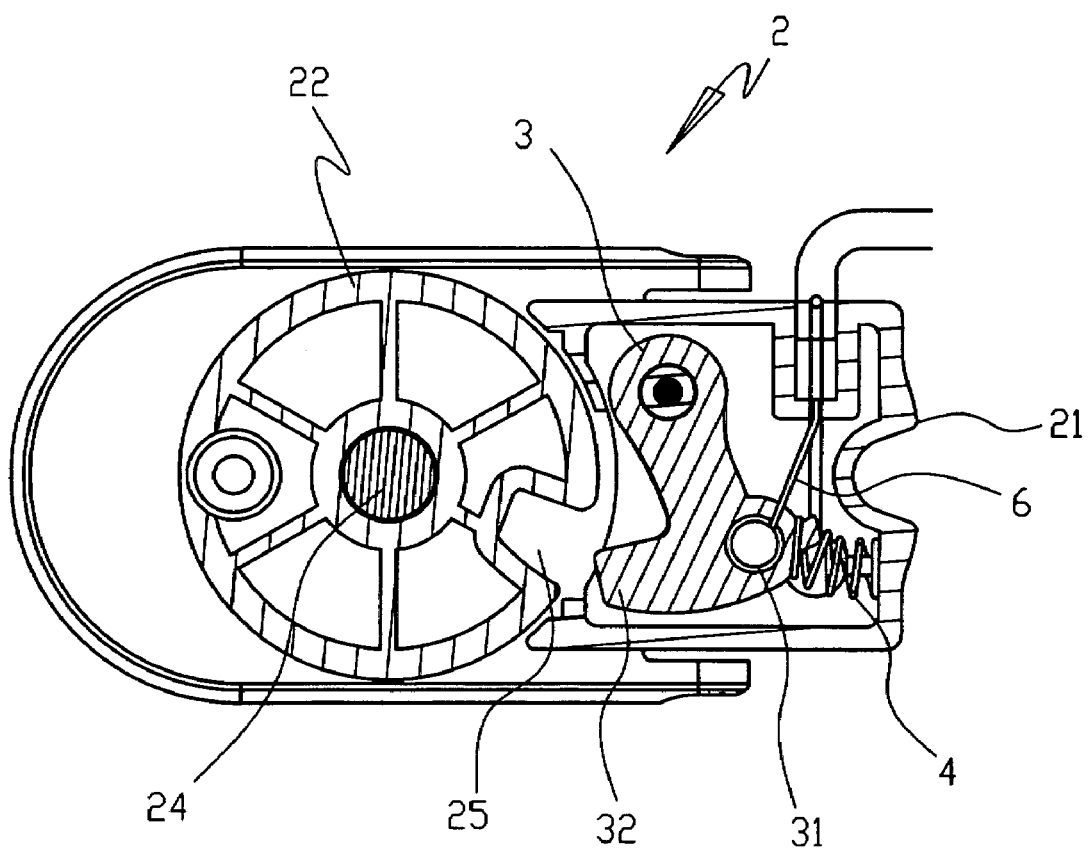
FIG. 5 is a schematic, cross-sectional view showing the positioning member moved out from the positioning portion of the wheel seat of the present invention.

As shown in FIGS. 2 and 5, the resilient element (4) is compressed and the positioning member (3) is pulled by connecting member (6) and removed from the positioning portion (25). In this way, the baby stroller is switched into a free steering mode.

In the present embodiment, the fixed-direction wheel control mechanism (1) includes a far-end controller (5), a connecting member (6) and a positioning member (3). The connecting member (6) is connected between the far-end controller (5) and the connecting end (31) of the positioning member (3). The far-end controller (5) is capable of being installed on any portion of the frame of baby stroller (10), to allow a user to more conveniently switch the wheel modes without bending their body in front of the stroller. In the present embodiment, as shown in FIGS. 1, 4 and 5, the far-end controller (5) is equipped on the side of handle tube (12), in order to facilitate the switching operation.

As shown in FIG. 4, the connecting member (6) can be made of any flexible material, such as a wire, as is illustrated in the present embodiment. When switching the stroller into free steering mode, a user draws the connecting member (6) by forcing the far-end controller (5) to move on the handle tube (12). In this way, the salient block (32) leaves the positioning portion (25) and releases the wheel seat (22).

As shown in FIG. 5, when the connecting member (6) is released, the resilient element (4) pushes the salient block (32) back into the positioning portion (25). In this way, the stroller is kept in a fixed-direction mode.

Figure 6:
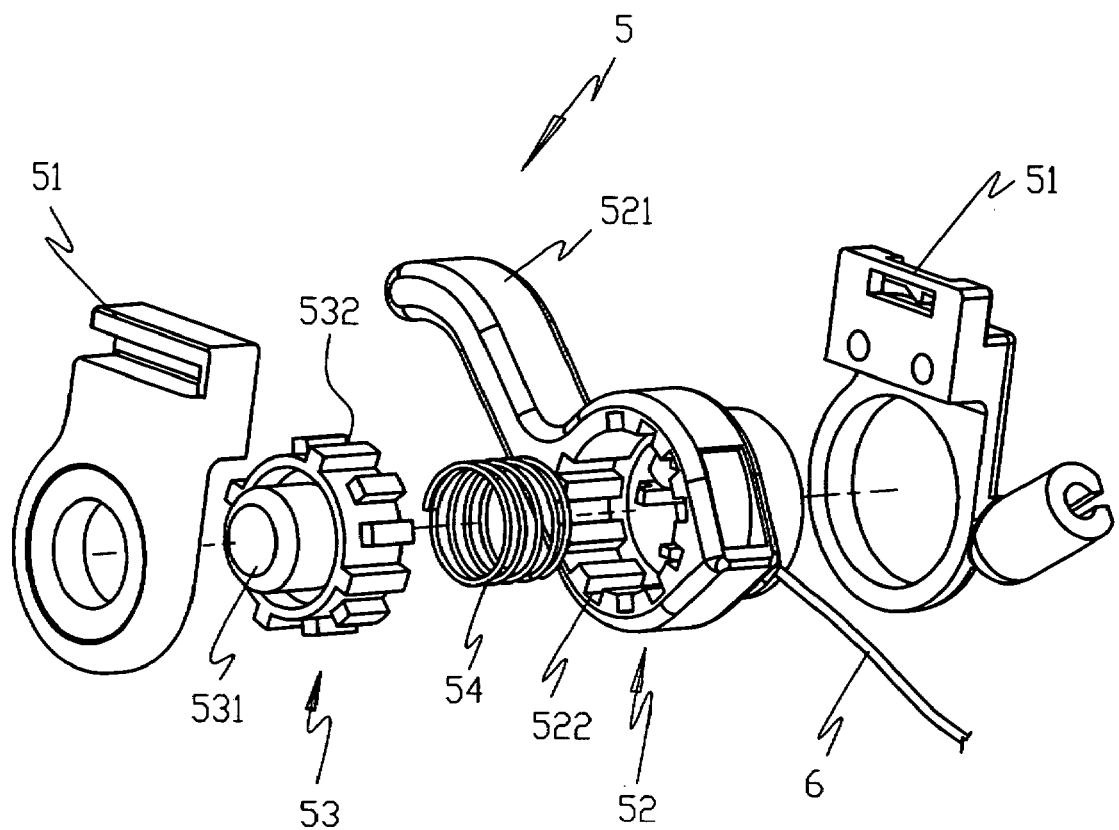
FIG. 6 is a schematic, isometric, exploded view of the far-end controller members of the present invention.

As shown in FIGS. 1 and 6, the far-end controller (5) includes a securing seat (51), a pulling member (52), a push button (53), and a restoring spring (54). The securing seat (51) is equipped at the handle tube (12) of the frame of baby stroller (10). The pulling member (52) is pivotally connected to the securing seat (51) and is connected to an end of the connecting member (6). The pulling member (52) includes a handle (521) and a positioning slot (522). The push button (53) includes a press portion (531) and a positioning tooth (532). The restoring spring (54) is installed between the push button (53) and the pulling member (52), and maintains the positioning tooth (532) of the push button (53) locating at the positioning slot (522) of the pulling member (52), in order to fix the pulling member (52). This makes the pulled member (52) unable to turn under normal conditions. When the user presses the push button (53), the positioning tooth (532) of the push button (53) is capable of separating from the positioning slot (522), in order to make the pulling member (52) turn freely to pull the connecting member (6).

By using the above-mentioned members, as shown in FIG. 4, the resilient element (4) biases the salient block (32) and maintains the salient block (32) in the positioning portion (25). Meanwhile, the wheel seat (22) is caught and fixed, and the stroller is switched into a fixed-direction mode. As shown in FIGS. 4 and 6, once a user wishes for the wheel seat (22) to turn freely, he or she can manipulate the push button (53) of the far-end controller (5) to release the limitation with respect to the pulling member (52). At this moment, the user can turn the pulling member (52) to pull the connecting member (6) through the handle (521). Since the connecting member (6) is connected between the pulling member (52) and the positioning member (3), once the pulling member (52) is turned, the positioning member (3) will be driven to turn, thereby compressing the resilient element (4). In this way, the salient block (32) of the positioning member (3) will be separated from the positioning portion (25) of the wheel seat (22), in order to release the limitations with respect to the wheel seat (22). This allows the wheel seat (22) to turn freely. At this moment, the user releases the push button (53) of the far-end controller (5) to allow the positioning tooth (532) of the push button (53) to engage with the positioning slot (522) of the pulling member (52), by using the resilience of the restoring spring (54). In this way, the positioning member (3) is able to maintain a released position, for releasing the limitations with respect to the wheel seat (22), as shown in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fixed-direction wheel control mechanism for a baby stroller, comprising:

a base seat secured at the front end of the frame of baby stroller;

a wheel seat for pivotally connecting the wheel, the wheel seat including a pivot shaft and a positioning portion, and the pivot shaft being pivotally connected to the base seat to make the wheel seat capable of freely rotating with respect to pivot shaft;

a positioning member pivotally connected to the base seat and capable of being engaged with the positioning portion of the wheel seat in order to limit rotation of the wheel seat;

a resilient element provided between the positioning member and the base seat, to allow the positioning member to remain engaged with the wheel seat; and a far-end controller installed on the frame of the baby stroller, the far end controller employing a connecting member to connect the far-end controller with the positioning member, and driving the positioning member, whereby the positioning member separates from the positioning portion, and maintains a released state or an engaged state through the connecting member, thereby permitting the user to selectively switch the wheel seat between a fixed-direction mode and a free steering mode;

the far-end controller being installed at a handle provided at the frame of baby stroller and further includes a securing seat, a pulling member, a push button, and a restoring spring, the other end of the connecting member being connected to the pulling member to make the connecting member drive the positioning member to turn through the turning of the pulling member, said push button being movable in the transverse direction of the baby sroller by manual actuation of the push button.

2. The fixed-direction wheel control mechanism for a baby stroller as claimed in claim 1, wherein the base seat further includes a fastener for limiting the separation of the pivot shaft of the wheel seat from the base seat, by engaging the fastener with a limiting ring provided at the distal end of the pivot shaft.

3. The fixed-direction wheel control mechanism for a baby stroller as claimed in claim 1, wherein the positioning portion of the wheel seat is a recess.

4. The fixed-direction wheel control mechanism for a baby stroller as claimed in claim 1, wherein a shock-resistant spring is provided at the wheel seat.

5. The fixed-direction wheel control mechanism for a baby stroller as claimed in claim 1, wherein the positioning member further includes a connecting end and a salient block; the colmecting end being connected to an end of the connecting member, and the salient block entering the positioning portion to engage positioning.

6. The fixed-direction wheel control mechanism for a baby stroller as claimed in claim 1, wherein the resilient element is a compression spring.

7. The fixed-direction wheel control mechanism for a baby stroller as claimed in claim 1, wherein the connecting member is a steel cable.

8. A fixed-direction wheel control mechanism for a baby stroller, comprising:
   a base seat secured at the front end of the frame of baby stroller;
   a wheel seat for pivotally connecting the wheel, the wheel seat including a pivot shaft and a positioning portion, and the pivot shaft being pivotally connected to the base seat to make the wheel seat capable of freely rotating with respect to pivot shaft;
   a positioning member pivotally connected to the base seat and capable of being engaged with the positioning portion of the wheel seat in order to limit rotation of the wheel seat;
   a resilient element provided between the positioning member and the base seat, to allow the positioning member to remain engaged with the wheel seat; and
   a far-end controller installed on the frame of the baby stroller, the far end controller employing a connecting member to connect the far-end controller with the positioning member, and driving the positioning member, whereby the positioning member separates from the positioning portion, and maintains a released state or an engaged state through the connecting member, thereby permitting the user to selectively switch the wheel seat between a fixed-direction mode and a free steering mode,
   said wheel seat having a top with a recess to form the positioning portion, the positioning member pivoting about a fixed point to engage the positioning portion, said positioning member having a first part transverse to a second part whereby the second part engages the positioning portion and the first part is pivoted about an end opposite the second part.

9. The fixed-direction wheel control mechanism for a baby stroller as claimed in claim 8, wherein the base seat further includes a fastener for limiting the separation of the pivot shaft of the wheel seat from the base seat, by engaging the fastener with a limiting ring provided at the distal end of the pivot shaft.

10. The fixed-direction wheel control mechanism for a baby stroller as claimed in claim 8, wherein the positioning portion of the wheel seat is a recess.

11. The fixed-direction wheel control mechanism for a baby stroller as claimed in claim 8, wherein a shock-resistant spring is provided at the wheel seat.

12. The fixed-direction wheel control mechanism for a baby stroller as claimed in claim 8, wherein the positioning member further includes a connecting end and a salient block;
   the connecting end being connected to an end of the connecting member, and the salient block entering the positioning portion to engage positioning.

13. The fixed-direction wheel control mechanism for a baby stroller as claimed in claim 8, wherein the resilient element is a compression spring.

14. The fixed-direction wheel control mechanism for a baby stroller as claimed in claim 8, wherein the connecting member is a steel cable.

15. A fixed-direction wheel control mechanism for a baby stroller, comprising:
   a base seat secured at the front end of the frame of baby stroller;
   a wheel seat for pivotally connecting the wheel, the wheel seat including a pivot shaft and a positioning portion, and the pivot shaft being pivotally connected to the base seat to make the wheel seat capable of freely rotating with respect to pivot shaft;
   a positioning member pivotally connected to the base seat and capable of being engaged with the positioning portion of the wheel seat in order to limit rotation of the wheel seat;
   a resilient element provided between the positioning member and the base seat, to allow the positioning member to remain engaged with the wheel seat; and
   a far-end controller installed on the frame of the baby stroller, the far end controller employing a connecting member to connect the far-end controller with the positioning member, and driving the positioning member, whereby the positioning member separates from the positioning portion, and maintains a released state or an engaged state through the connecting member, thereby permitting the user to selectively switch the wheel seat between a fixed-direction mode and a free steering mode;
   the far-end controller being installed at a handle provided at the frame of baby stroller, and further includes a securing seat, a pulling member, a push button, and a restoring spring, the other end of the connecting member being connected to the pulling member to make the connecting member drive the positioning member to turn through the turning of the pulling member, said push button being movable in the transverse direction of the baby stroller by manual actuation of the push button;
   said wheel seat having a top with a recess to form the positioning portion, the positioning member pivoting about a fixed point to engage the positioning portion, said positioning member having a first part transverse to a second part whereby the second part engages the positioning portion and the first part is pivoted about an end opposite the second part;
   the pivot shaft extending upwardly from said wheel seat and being fixed thereto and extending into said base seat and rotationally mounted therein.

16. The fixed-direction wheel control mechanism for a baby stroller as claimed in claim 15, wherein the base seat further includes a fastener for limiting the separation of the pivot shaft of the wheel seat from the base seat, by engaging the fastener with a limiting ring provided at the distal end of the pivot shaft.

17. The fixed-direction wheel control mechanism for a baby stroller as claimed in claim 15, wherein the positioning portion of the wheel seat is a recess.

18. The fixed-direction wheel control mechanism for a baby stroller as claimed in claim 15, wherein a shock-resistant spring is provided at the wheel seat.

19. The fixed-direction wheel control mechanism for a baby stroller as claimed in claim 15, wherein the positioning member further includes a connecting end and a salient block;
   the connecting end being connected to an end of the connecting member, and the salient block entering the positioning portion to engage positioning.

20. The fixed-direction wheel control mechanism for a baby stroller as claimed in claim 15, wherein the resilient element is a compression spring.

* * * * *